W. DIETER.
STOP AND RELIEF VALVE FOR AUTOMOBILE TORPEDOES.
APPLICATION FILED JULY 20, 1917.

1,319,992.

Patented Oct. 28, 1919.

WITNESSES:
René Bruine
Ethel E. Nelson

INVENTOR:
William Dieter,
By Attorneys,
Fraser, Funk & Myers

UNITED STATES PATENT OFFICE.

WILLIAM DIETER, OF BROOKLYN, NEW YORK, ASSIGNOR TO E. W. BLISS COMPANY, OF BROOKLYN, NEW YORK, A CORPORATION OF WEST VIRGINIA.

STOP AND RELIEF VALVE FOR AUTOMOBILE TORPEDOES.

1,319,992.            Specification of Letters Patent.            Patented Oct. 28, 1919.

Application filed July 20, 1917. Serial No. 181,808.

*To all whom it may concern:*

Be it known that I, WILLIAM DIETER, a citizen of the United States of America, residing in the borough of Brooklyn, county of Kings, city and State of New York, have invented certain new and useful Improvements in Stop and Relief Valves for Automobile Torpedoes, of which the following is a specification.

This invention relates to automobile torpedoes, which are provided with means for heating the stored compressed air during its flow from the reservoir or air flask to the turbine or engine. In such torpedoes it is common to spray into the heater (or superheater so-called) both alcohol (or other liquid fuel) and water, the latter being vaporized by the heat and converted into steam. The alcohol and water are carried in tanks or vessels containing normally no pressure, and the liquids are expelled from these tanks by the turning on of compressed air which at reduced pressure enters the tops of the tanks and expels the liquids which flow through pipes leading from the bottoms of the tanks to the respective spray nozzles in the superheater. It is necessary to provide the compressed air pipes leading to the tops of these tanks and the liquid eduction pipes leading from the bottoms thereof with valves which are closed prior to the launching of the torpedo, so that no liquid can escape from the tanks, and so that no sea-water from the exterior can enter them. The reason for such valves and their general arrangement and operation are fully set forth in the patent to F. M. Leavitt, No. 1,022,486, dated April 9, 1912, to which reference will hereinafter be made.

The present invention provides certain improvements designed to more thoroughly perfect the operation of the apparatus. The valves of said Leavitt patent are essentially check valves held closed to prevent any inflow to the respective tanks or vessels and so constructed as to open automatically when pressure is introduced and permit the inflow of compressed air and the outflow of liquids under pressure. In such Leavitt patent these check valves are vented directly to the exterior of the hull, so that with the torpedo in a submerged launching tube the salt-water under more or less pressure has access to these vents. According to the present invention the check valves are not directly vented to the exterior, but are so vented through the medium of spring-pressed relief valves. The object and results of this change will be fully set forth hereinafter.

In the accompanying drawings,—

Figure 1:
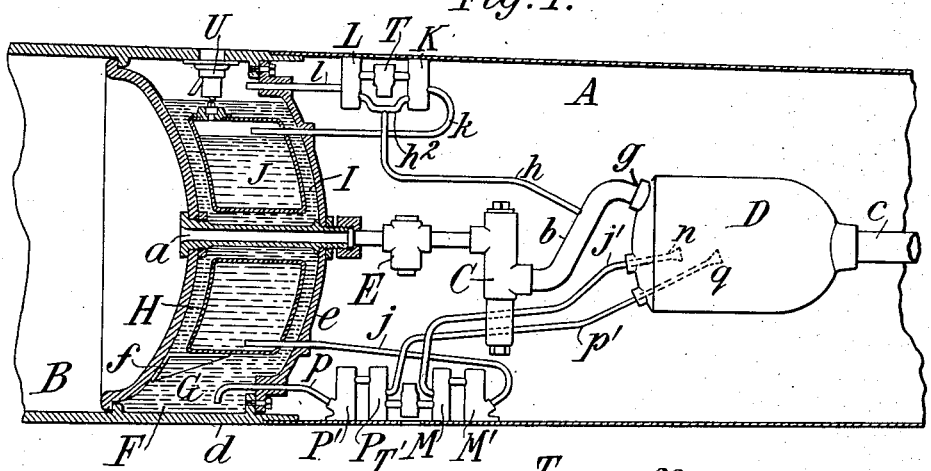
Figure 1 is a vertical longitudinal mid-section of a portion of a torpedo including the aft end of the air flask, the superheater, and the intermediary parts. In this view the parts are rearranged in a somewhat diagrammatic manner so as to make the connections and relations of the several parts clearly apparent.

In Fig. 1 A is the hull of the torpedo, and B is the compressed air reservoir or flask. From this flask an outlet pipe $a$ leads to a pressure-reducing valve C by which the air pressure in the flask is reduced to a lower and uniform pressure (say about 400 pounds per square inch). From the low pressure side of this valve leads a pipe $b$ which extends to the superheater D and from the latter a pipe $c$ leads to the engine (not shown) which is commonly a turbine. At some suitable point in the pipe or passage $a$ is introduced a starting valve E (shown diagrammatically) which may be of any known construction, and whereby the air is admitted to the heater and engine at the instant of launching the torpedo.

The preferred construction of alcohol and water vessels is that shown, where the outer walls of the air flask are extended rearwardly forming a cylindrical wall $d$ having a flange to which is securely attached a disk or head $e$, constituting thus a container F which is sub-divided into two compartments by a partition H of comparatively thin metal which is best constructed in the form of an annular vessel having a central opening for the free passage through it of the pipe $a$, and which is supported within the container F in any suitable manner, as by brackets $f\ f$. This partition H thus divides the chamber G into two compartments constituting liquid vessels or tanks, an outer compartment I, and an inner compartment J. The outer compartment is commonly used to hold water and the inner compartment to hold alcohol or other combustible fluid.

In the reduced pressure pipe $b$ a slight choking or contraction is provided, being commonly located at the connection $g$ where this pipe enters the superheater. At any point prior to this choked portion a branch pipe $h$ leads to valves L and K branching at $h^2$ so as to supply both valves. From these valves pipes $l$ and $k$ lead respectively to the upper sides of the water and alcohol vessels for introducing compressed air thereinto.

From the bottom of the fuel vessel J leads a pipe $j$ which extends through a strainer M′ to a stop valve M, and thence the pipe $j'$ leads to the superheater and terminates in a spray nozzle $n$. From the bottom of the water compartment I extends a pipe $p$ which leads (through a strainer P′) to a check valve P, and thence the pipe $p'$ leads to the superheater and terminates in a spray nozzle $q$.

So far as described the parts all correspond to the like lettered parts in said Leavitt Patent No. 1,022,486 (except for the addition of the strainers M′ P′).

Figure 3:
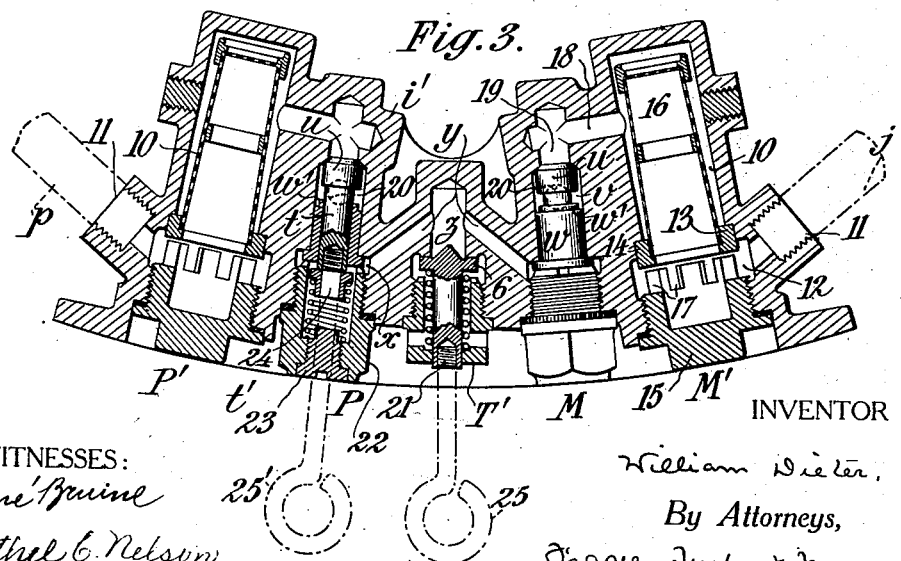

The stop or check valves K L M P in the present construction somewhat resemble the check valves M P shown in Figs. 3 and 4 of said Leavitt patent. Each valve is formed as a tappet $u$ having a stem $t$ pressed to its seat by a spring $t'$; but instead of the spring reacting against a plug $t^2$ (as in said Leavitt patent) through which is a vent opening to the exterior, the spring reacts against a closed plug or cap, and there is no direct vent to the exterior.

Figure 2:
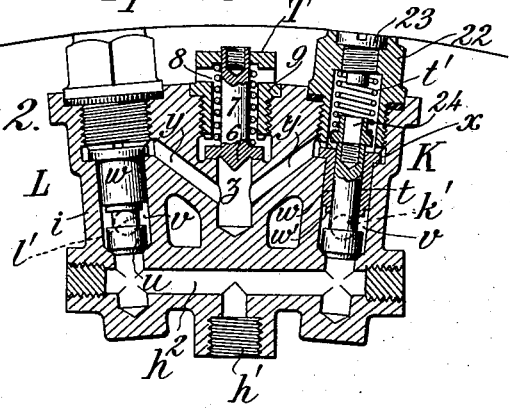
Figs. 2 and 3 are sections transverse to the torpedo but on a much larger scale, Fig. 2 being a vertical mid-section through the upper valve group and Fig. 3 a similar section through the lower valve group.

I will describe the valve construction first with reference to Fig. 2, which shows the upper valves K L. For convenience the two valves are constructed with a single shell or casing $i$. The compressed air pipe $h$ enters at $h'$ into a cross-duct $h^2$ which feeds both valves. This duct terminates beneath the seats of the valves, and when air is admitted under sufficient pressure to lift the valves against their light springs $t'$, air passes into a valve chamber $v$ and escapes thence through an outlet conduit $k'$ or $l'$ (shown by the dotted circle) to the pipes $k$ $l$ respectively leading to the alcohol and water vessels. The valve stem $t$ has a close working fit in a suitable bushing $w$ and any leakage between the stem and bushing passes into an annular chamber $x$ and escapes thence through a duct $y$ to the inlet chamber $z$ of a relief valve T. This valve consists simply of an outwardly opening valve or tappet 6 on a stem 7 and pressed down by a spring 8. The valve for convenience is mounted in a plug 9 which screws into the casing $i$, the stem 7 projecting partly out through an opening in the plug and the top of the plug being contracted so as to engage and guide the stem and serve as an abutment for the spring 8.

The valves K L close as check valves against any outflow from the water or alcohol vessels toward the superheater, and hence prevent any loss of water or alcohol during the handling of the torpedo prior to launching (as for example if the torpedo should be rolled over so as to invert it). In case of any leakage of pressure into the water vessel, it will escape through a relief valve U of the type set forth in my Patent No. 1,125,979, dated January 26, 1915 (which is not here shown in detail). Any tendency to an outflow from the vessels through their pipes $k$ $l$ into the valve chambers $v$ $v$ can result only in leakage up up around the stems $t$ and from the chambers $x$ through $y$ and $z$ to the relief valve T. The spring 8 of this valve is constructed to yield only to pressures exceeding that required to open the relief valves in the after-body, or a pressure of about two pounds. Hence unless the pressure exceeds that for which the valve T is set, this valve will not open. The principal function of the valve T is to absolutely prevent any inflow of seawater from the exterior which otherwise might leak past the stems $t$ and by outlets $k'$ $l'$ and pipes $k$ $l$ pass into the water and alcohol vessels.

Referring to Fig. 3, the check valves M and P (which in said Leavitt patent are separately constructed) are here formed in a common inclosing case or shell $i'$ which also incloses the strainers M′ P′. The construction of the valves M P is precisely the same as that shown in Fig. 2, except that the parts are inverted and there is no common inlet $h'$ or connecting passage $h^2$. The relief valve introduced between the two check valves is here lettered T′. It is constructed and connected with the respective check valves in precisely the same manner as shown in Fig. 2. The strainers M′ P′ comprise each a chamber 10 formed in the casing $i'$ with an inlet 11 thereto communicating with an annular chamber 12 separated from the strainer chamber 10 by a seat 13 against which fits an annular portion 14 of a strainer plug 15 which carries the perforated strainer 16, the latter being of cylindrical form and projecting deeply into the chamber 10. The plug 15 has a series of ports 17 through which liquid enters from the chamber 12 to the interior of the strainer and passing through the latter into the chamber 10 flows out from this chamber through ducts 18, 19, and forcing open the valves $u$ enters the respective chambers $v$ and flows out therefrom through outlets 20, 20 (shown by dotted circles) on the aft side of the valve casing, from which lead the pipes $p'$ $j'$ passing to the superheater. The pipes $p$ $j$ from the water and alcohol vessels enter the inlets 11, 11.

The tappets $u$ of the respective valves K, L, M and P being on the stems $t$ of considerable area in cross section are forced wide open when the fluid pressure against them exceeds the resistance of the springs $t'$, being then seated against the ends $w'$ of the bushings $w$.

The relief valve T' has in general the same functions as the relief valve T. Any leakage of compressed air past the tappet stems $t$, on entering chambers $x$ escapes by $y$ $z$ and if under sufficient pressure lifts the tappet 6 and escapes to the exterior. At all other times the valve T' acts as a check valve to prevent any inflow of sea water.

It is desirable to be able to test the valves T T' to make sure that the tappets have not become stuck fast to the seats and that the springs have the proper resistance. For this purpose the stem 7 of each valve has a socket 21 drilled into its end and screw-threaded, into which may be screwed a rod shown in dotted lines at 25 in Fig. 3, having upon its end a hook or head whereby the valve may be pulled off from its seat.

For testing the check valves K L M P without disassembling them, each valve is constructed with a main plug or cap 22 screwing in from the exterior with a packing for making a tight joint and with an internal chamber housing the spring $p'$; and each plug or cap 22 has in its outer end a removable plug 23 which may be withdrawn without disarranging the spring. The stem $t$ of each valve is provided with a socket 24 drilled out and tapped so that by removing the plug 23 a screw-threaded end of a rod 25' shown in dotted lines in Fig. 3 may be introduced through the plug 22 and screwed into the threaded socket 24, whereby the tappet $u$ may be forcibly unseated and tested.

The operation and advantages will now be explained.

Prior to launching, the torpedo during handling may be rolled over or occupy various positions. Any tendency to an outflow of alcohol or water from the vessels I J is prevented by the check valves K L which close with such flow, and by the valves M P which would open with the flow but the springs of which are strong enough to hold them seated so long as no pressure is admitted to the vessels other than that incident to the weight of the liquids. If any leakage of air should occur through the valves E C, this leakage would normally escape through the engine into the after-body and tail section through the usual relief or exhaust valves which open under a pressure of two pounds per square inch, so that the pressure due to such leakage could not exceed that amount. Under that pressure, however, there would be a back pressure transmitted through the pipes $h$ $j'$ $p'$ to the respective valve seats. The inflow through $h$ might unseat the valves K L in which case it would freely enter both vessels I J and being a slow leakage would be vented therefrom through relief valve U with which these vessels are provided. (See Patent No. 1,125,979.) Such leakage could not have sufficient pressure to escape by the relief valve T. Any back flow through the pipes $j'$ $p'$ would enter the valves M P and be stopped at the tappets $u$ which would cut off such flow from the vessels I J and would be stopped at the valve T'. Consequently, preparatory to being placed in the launching tube, the torpedo would be subject to no loss of liquids from the vessels I J.

The same is true of the torpedo while resting in an above-water launching tube preparatory to launching.

In the case of a submerged launching tube the conditions are different because of the external pressure which surrounds the torpedo within the launching tube. In case of submarines which often dive to a considerable depth this outside pressure against the torpedo is considerable, and is very apt to cause an in-leak of sea-water. Such in-leakage is absolutely prevented by the valves T T'.

After launching (from either an above-water or under-water tube) the conditions are changed. The starting valve E is opened which admits compressed air through the reducer C (by which its pressure is reduced to, say, about 400 pounds per square inch) and thence through the superheater D to the engine. The constriction at $g$ creates a slight differential of pressure sufficient to feed over the alcohol and water into the superheater. The compressed air passing through $h$ enters beneath the valves K L (Fig. 2) throwing their tappets $u$ wide open, and flowing without further restriction into the vessels I J. The pressure in these vessels instantly closes the direct relief valves U with which they are provided (per Patent No. 1,125,979). Some leakage of compressed air will naturally occur due to the working fit between the stems $t$ and bushings $w$ and this will escape through the relief valve T to the exterior, its pressure being sufficient to force open this valve.

The admission of compressed air to the superheater D results in a back pressure through the pipes $j'$ $p'$ to the valves M P which tends to seat their tappets $u$; the preponderant pressure (due to the constriction $g$) admitted to the vessels I J passes to the valves M P through their inlets 11, strainers 16, ducts 18, 19 and forces open their tappets $u$. Any leakage past the stems $t$ escapes to the exterior by forcing open the relief valve T'.

The leakages of compressed air which escape through relief valves T T' occur only during the run of the torpedo and are so small in volume as to be practically negligible.

With the construction of check or stop valve shown in Patent No. 1,022,486 there was liability when the torpedo was placed in a submerged launching tube that the external pressure would cause the sea-water to enter through the vents of the stop valves and by leaking past the valve stems to enter the superheater. There was also liability if the stop valves should become leaky of an out-leakage of water or alcohol through the vents prior to placing in the launching tube, or while in an above-water launching tube. These difficulties are entirely overcome by the provision of the relief valves T and T' which are provided by the present invention. These valves also have the advantage that they exclude salt water, grit, etc., and prevent these reaching the springs t' of the check valves whereby any corrosion or stoppage is avoided such as with the old construction would occasionally impair the operation of the check valves.

The invention is not limited to the precise details of construction herein set forth, it being possible to considerably vary the specific construction of the respective valves and their communicating passages, and otherwise to modify the details of the construction without departing from the essence of the invention.

What I claim is:—

1. In a torpedo, comprising a liquid tank, a heater, a connecting conduit, and a stop-valve normally closing said conduit, the combination therewith of a relief valve communicating with such stop-valve and adapted to discharge outwardly excess fluid under pressure, and to prevent inflow of sea water.

2. The construction of claim 1, said stop-valve comprising a tappet and stem, with a duct receiving leakage from around said stem, and the relief-valve closing said duct and opening outwardly.

3. The structure of claim 1, with said stop-valve in an air-inlet conduit to the top of the tank, and the relief-valve spring-closed, and opening only on admission of compressed air.

4. The structure of claim 1, with said stop-valve in a liquid conduit from the bottom of the tank, and the relief-valve spring-closed and opening only on the forcing open of the stop-valve by liquid under pressure.

5. In a torpedo comprising a liquid tank, a heater, an air inlet conduit leading to the top of said tank, an outlet conduit leading from the bottom of said tank to the heater, and stop-valves in said conduits adapted to open with the flow of air to the tank and of liquid therefrom, and relief valves communicating with said stop-valves respectively, spring-closed and opening outwardly under pressure.

6. The structure of claim 5, each stop-valve comprising a tappet and stem with a duct receiving leakage from around said stem and leading to the corresponding relief valve.

7. In a torpedo comprising liquid tanks for fuel and water, a heater, connecting conduits for admitting compressed air to the tops of said tanks and conducting liquids from the bottoms of said tanks to the heater, stop-valves in said respective conduits, and relief valves communicating with such stop-valves and adapted to discharge outwardly excess fluids under pressure and to prevent inflow of sea water.

8. In a torpedo comprising liquid tanks for holding fuel and water respectively, a heater, a conduit for admitting compressed air branched and entering the tops of said tanks, conduits conducting liquids from the bottoms of said tanks to the heater, stop-valves in the respective branches of said air conduit, and a relief valve communicating with both such stop-valves.

9. The structure of claim 8, the respective stop-valves and relief valves having a single casing formed with the communicating ducts between said stop-valves and the relief valve.

10. In a torpedo comprising liquid tanks for holding fuel and water respectively, a heater, conduits for admitting compressed air to the tops of said tanks, conduits for conducting liquids from the bottoms of said tanks to the heater, stop-valves in said latter conduits, and a relief valve communicating with both said stop-valves.

11. The structure of claim 10, with a single casing for said stop-valves and relief valve formed with the communicating ducts between said stop-valves and the relief valve.

In witness whereof, I have hereunto signed my name.

WILLIAM DIETER.

In presence of—
JOSEF J. HAYES.